United States Patent
Wang

(10) Patent No.: US 10,289,276 B2
(45) Date of Patent: May 14, 2019

(54) MANAGING TAB BUTTONS

(71) Applicant: Alibaba Group Holding Limited, Grand Cayman (KY)

(72) Inventor: Qiqi Wang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 585 days.

(21) Appl. No.: 14/137,114

(22) Filed: Dec. 20, 2013

(65) Prior Publication Data

US 2014/0189570 A1 Jul. 3, 2014

(30) Foreign Application Priority Data

Dec. 31, 2012 (CN) .......................... 2012 1 0593320

(51) Int. Cl.
*G06F 3/0482* (2013.01)
*G06F 3/0483* (2013.01)
*G06F 3/0488* (2013.01)

(52) U.S. Cl.
CPC .......... *G06F 3/0483* (2013.01); *G06F 3/0482* (2013.01); *G06F 3/04883* (2013.01)

(58) Field of Classification Search
None
See application file for complete search history.

(56) References Cited

U.S. PATENT DOCUMENTS

| | | | | |
|---|---|---|---|---|
| 5,745,716 A * | 4/1998 | Tchao | ................... | G06F 3/0483 715/777 |
| 6,333,753 B1 * | 12/2001 | Hinckley | ............ | G06F 3/03543 345/156 |
| 6,513,035 B1 * | 1/2003 | Tanaka | .............. | G06F 17/30265 |
| 6,516,329 B1 * | 2/2003 | Smith | ................ | G06F 17/30699 707/999.003 |
| 6,538,635 B1 * | 3/2003 | Ringot | .................. | G06F 3/0482 345/156 |
| 6,693,651 B2 * | 2/2004 | Biebesheimer | ... | G06F 17/30696 707/E17.082 |
| 7,249,325 B1 * | 7/2007 | Donaldson | .......... | G06F 3/03547 345/169 |

(Continued)

FOREIGN PATENT DOCUMENTS

| | | |
|---|---|---|
| CN | 102736904 | 10/2012 |
| EP | 1986087 | 10/2008 |

(Continued)

OTHER PUBLICATIONS

Author: Avant Browser Title: Avant Browser Help—Full Screen/Desktop Mode Date: Oct 8, 2012 pp. 1 (Year: 2012).*

(Continued)

*Primary Examiner* — Ajay M Bhatia
*Assistant Examiner* — Phoebe X Pan
(74) *Attorney, Agent, or Firm* — Lee & Hayes, P.C.

(57) ABSTRACT

The present disclosure provides an example method and system for managing tab buttons. A tab sliding bar including multiple tab buttons is established. A focusing area is set up at a display area. When the tab sliding bar is slid, information of a tab button among the multiple tab buttons that has fallen within the focusing area is obtained. The information of the tab button that has fallen within the focusing area is used as input information at a page. The page is displayed according to the input information.

14 Claims, 7 Drawing Sheets

(56) References Cited

U.S. PATENT DOCUMENTS

| | | | |
|---|---|---|---|
| 7,328,177 B1* | 2/2008 | Lin-Hendel | G06F 17/30867 705/26.61 |
| 7,415,677 B2* | 8/2008 | Arend | G06F 3/04895 715/798 |
| 7,634,740 B2* | 12/2009 | Enomoto | G06F 3/0338 715/810 |
| 7,661,075 B2* | 2/2010 | Lahdesmaki | G06F 3/0482 715/821 |
| 7,698,261 B1* | 4/2010 | Khoshnevisan | G06F 17/30705 707/999.003 |
| 8,027,884 B2* | 9/2011 | Bezos | G06Q 10/087 705/26.61 |
| 8,255,824 B2* | 8/2012 | Selig | G06F 17/243 715/781 |
| 8,375,321 B2* | 2/2013 | Cruz Moreno | G06F 17/30899 715/777 |
| 8,458,612 B2* | 6/2013 | Chatterjee | G06F 3/04817 715/779 |
| 8,601,389 B2* | 12/2013 | Schulz | G06F 3/0482 345/156 |
| 9,013,504 B2* | 4/2015 | Nishina | G01C 21/20 345/419 |
| 9,361,640 B1* | 6/2016 | Donsbach | G06Q 30/0625 |
| 2001/0015718 A1* | 8/2001 | Hinckley | A63F 13/06 345/156 |
| 2002/0007378 A1* | 1/2002 | Tanaka | G06Q 30/02 715/234 |
| 2002/0078045 A1* | 6/2002 | Dutta | G06F 17/30675 |
| 2002/0113784 A1* | 8/2002 | Feilmeier | G06F 1/1626 345/419 |
| 2002/0125712 A1 | 9/2002 | Felderman | |
| 2002/0152135 A1* | 10/2002 | Beeri | G06Q 30/0253 705/14.51 |
| 2003/0034999 A1* | 2/2003 | Coughlin, III | G09B 7/00 715/738 |
| 2003/0221167 A1* | 11/2003 | Goldstein | G06F 17/30905 715/234 |
| 2004/0133564 A1* | 7/2004 | Gross | G06F 17/30398 |
| 2004/0261035 A1* | 12/2004 | Emerson | G06F 3/0483 715/777 |
| 2005/0050301 A1* | 3/2005 | Whittle | G06F 9/4443 712/32 |
| 2005/0144093 A1* | 6/2005 | Kassan | G06Q 30/06 705/26.3 |
| 2005/0144162 A1* | 6/2005 | Liang | G06F 17/30109 |
| 2006/0036950 A1* | 2/2006 | Himberger | G06F 3/0481 715/732 |
| 2006/0064410 A1* | 3/2006 | Razza | G06F 17/3089 |
| 2006/0136834 A1* | 6/2006 | Cao | G06F 3/0485 715/779 |
| 2006/0190441 A1* | 8/2006 | Gross | G06F 17/30864 |
| 2006/0230356 A1* | 10/2006 | Sauve | G06F 3/0481 715/777 |
| 2006/0248475 A1* | 11/2006 | Abrahamsson | G06F 3/0482 715/835 |
| 2006/0253794 A1* | 11/2006 | Wilson | G06Q 30/02 715/779 |
| 2007/0021145 A1* | 1/2007 | Lam | H04M 1/72563 455/556.1 |
| 2007/0130258 A1* | 6/2007 | Almberg | G06Q 10/107 709/204 |
| 2007/0266334 A1 | 11/2007 | Donaldson | |
| 2007/0298866 A1* | 12/2007 | Gaudiano | A63F 13/00 463/23 |
| 2008/0189645 A1* | 8/2008 | Kapanen | G06F 3/0481 715/777 |
| 2008/0204402 A1* | 8/2008 | Hirata | G06F 3/0481 345/156 |
| 2008/0235608 A1* | 9/2008 | Prabhu | G06F 17/30867 715/765 |
| 2008/0307363 A1* | 12/2008 | Jalon | G06F 17/30126 715/835 |
| 2008/0313574 A1* | 12/2008 | Aravamudan | G06F 17/30899 715/854 |
| 2009/0063304 A1* | 3/2009 | Meggs | G06Q 10/06 705/26.62 |
| 2009/0119589 A1* | 5/2009 | Rowell | G06F 3/04817 715/716 |
| 2009/0128587 A1* | 5/2009 | Komiya | G06F 3/14 345/690 |
| 2009/0150810 A1* | 6/2009 | Burroughs | G06F 17/30873 715/764 |
| 2009/0172596 A1* | 7/2009 | Yamashita | G06F 3/0482 715/834 |
| 2009/0265657 A1* | 10/2009 | Bamford | G06F 3/04817 715/786 |
| 2009/0300536 A1 | 12/2009 | Wilson et al. | |
| 2010/0011313 A1 | 1/2010 | Sauve et al. | |
| 2010/0169772 A1* | 7/2010 | Stallings | G06F 3/04812 715/702 |
| 2010/0180225 A1* | 7/2010 | Chiba | G06F 3/0481 715/777 |
| 2010/0281374 A1* | 11/2010 | Schulz | G06F 3/0482 715/723 |
| 2010/0299614 A1* | 11/2010 | Hangas | G06F 3/04817 715/752 |
| 2010/0302172 A1* | 12/2010 | Wilairat | G06F 3/04883 345/173 |
| 2010/0318551 A1* | 12/2010 | Lai | G06F 17/30867 707/765 |
| 2011/0004841 A1* | 1/2011 | Gildred | G06Q 30/08 715/780 |
| 2011/0072387 A1 | 3/2011 | Fisher et al. | |
| 2011/0078055 A1* | 3/2011 | Faribault | G06Q 30/02 705/27.2 |
| 2011/0083078 A1* | 4/2011 | Ju | G06F 3/0481 715/738 |
| 2011/0093819 A1* | 4/2011 | Irvine | G06F 3/038 715/856 |
| 2011/0096097 A1 | 4/2011 | Matsuki | |
| 2011/0113363 A1* | 5/2011 | Hunt | G06F 3/0481 715/800 |
| 2011/0115737 A1* | 5/2011 | Fuyuno | G06F 1/1616 345/173 |
| 2011/0138313 A1* | 6/2011 | Decker | G06F 3/0481 715/777 |
| 2011/0138331 A1* | 6/2011 | Pugsley | G06F 17/30026 715/835 |
| 2011/0145750 A1 | 6/2011 | Yodo et al. | |
| 2011/0161845 A1* | 6/2011 | Stallings | G06F 17/30277 715/762 |
| 2011/0167376 A1 | 7/2011 | Sauve et al. | |
| 2011/0202843 A1 | 8/2011 | Morris | |
| 2011/0271217 A1 | 11/2011 | Cruz Moreno et al. | |
| 2011/0295720 A1 | 12/2011 | Parikh et al. | |
| 2012/0162160 A1* | 6/2012 | Amano | G06F 9/4443 345/204 |
| 2012/0290965 A1* | 11/2012 | Ignor | G06F 3/0482 715/777 |
| 2012/0330778 A1* | 12/2012 | Eastham | G06Q 30/02 705/26.7 |
| 2013/0061159 A1* | 3/2013 | Tseng | G06F 17/30873 715/760 |
| 2013/0061160 A1* | 3/2013 | Tseng | G06F 17/30905 715/760 |
| 2013/0076595 A1* | 3/2013 | Sirpal | G06F 3/1438 345/1.3 |
| 2013/0104063 A1* | 4/2013 | Legris | G06F 3/0484 715/765 |
| 2013/0104070 A1* | 4/2013 | Blake | G06Q 50/01 715/777 |
| 2013/0205244 A1* | 8/2013 | Decker | G06F 17/21 715/777 |
| 2013/0246964 A1* | 9/2013 | Kazawa | G06F 3/0483 715/777 |
| 2014/0013276 A1* | 1/2014 | Butterworth | G06F 3/04886 715/821 |

(56) References Cited

U.S. PATENT DOCUMENTS

| | | | | |
|---|---|---|---|---|
| 2014/0298240 A1* | 10/2014 | Jitkoff | ............... | G06F 3/0481 715/777 |
| 2015/0177933 A1* | 6/2015 | Cueto | ............... | G06F 3/0483 715/776 |
| 2015/0378558 A1* | 12/2015 | Smith | ............... | G06F 3/04817 715/777 |
| 2017/0300183 A1* | 10/2017 | Barrus | ............... | G06F 3/0482 |

FOREIGN PATENT DOCUMENTS

| | | |
|---|---|---|
| JP | 2003067108 | 3/2003 |
| JP | 2006033094 | 2/2006 |
| JP | 2008515041 | 5/2008 |
| JP | 2012190231 | 10/2012 |

OTHER PUBLICATIONS

PCT Search Report and Written Opinion dated Nov. 14, 2014 for PCT Application No. PCT/IB2013/003242, 15 Pages.

Translated Chinese Office Action dated Aug. 16, 2016 from Appication No. 20120593320.3, 22 pages.

Translated Japanese Office Action dated Sep. 26, 2017 for Japanese Patent Application No. 2015-550159, a counterpart foreign application of U.S. Appl. No. 14/137,114, 9 pages.

* cited by examiner

MANAGING TAB BUTTONS

CROSS REFERENCE TO RELATED PATENT APPLICATIONS

This application claims foreign priority to Chinese Patent Application No. 201210593320.3 filed on 31 Dec. 2012, entitled "Method and System for Managing Tab Buttons," which is hereby incorporated by reference in its entirety.

TECHNICAL FIELD

The present disclosure relates to the field of smart terminal device, and more specifically, to a method and a system for managing tab buttons.

BACKGROUND

With the popularity and development of mobile terminals, there are more and more applications for mobile terminals. However, designs and detail deployments of many applications at the mobile terminals still follow conventional designs for personal computers.

The main difference between a mobile terminal and a personal computer is that the mobile terminal is smaller in size and is easier to carry. Accordingly, a screen of the mobile terminal such as a tablet or a smart phone is relatively small as compared with that of the personal computer. Even though there is a trend to design a big screen for the mobile terminal, the screen of the mobile terminal cannot match that of the personal computer. Therefore, a space of a screen for the mobile terminal is precious such that all applications designed for the mobile terminal try to make reasonable use of the screen of the mobile terminal. However, there are still a lot of applications that follow the design patterns for personal computers and cannot make progress in using the space of the screen of a mobile terminal.

The above drawback is more apparent in the design of a tab button. For example, a lot of applications have multiple tab buttons at their interfaces. Such multiple tab buttons occupy one line or multiple lines in the space and form a tab button bar. A user clicks the tab button for operation. However, as the screen of the mobile terminal is small and there is less display space, in order to reserve more space for a main interface in the small screen of the mobile terminal, the tab buttons are designed in small sizes. While the current mobile terminals often use touch screens as input devices, the tab buttons which are too small in size are disadvantageous for the user to click and choose an item. Thus, by using conventional designs for the tab buttons and the tab button bar, the user often cannot accurately click the tab button or cannot click a target tab button.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to apparatus(s), system(s), method(s) and/or computer-readable instructions as permitted by the context above and throughout the present disclosure.

The present disclosure provides a method and a system for managing tab buttons. The present techniques use a focusing area to obtain information of a tab button that has fallen within the focusing area and avoid clicking the tab button, thereby improving accuracy and convenience of selecting the tab button.

The present disclosure provides an example method for managing tab buttons.

A tab sliding bar including a plurality of tab buttons is established. A focusing area is set up at an area of a display screen. When the tab sliding bar is slid, information of a tab button that has fallen within the focusing area is obtained. The information of the tab button that has fallen within the focusing area is used as input information at a page. The page is displayed according to the input information. For example, the page may include a list of search results. The list of search results includes one or more business objects.

An example method for displaying the page according to the input information may include the following. The one or more business objects are re-ranked and displayed according to the input information.

The example method for managing the tab buttons may further include the following. A coordinate system covering the display screen is constructed. The focusing area and each tab button are assigned a coordinate respectively. An example method for obtaining information of the tab button that has fallen within the focusing area may include the following. When a time period that the tab buttons are not slid reaches a first time threshold, a tab button with a minimal coordinative difference from the focusing area is determined as having fallen within the focusing area.

The example method for managing the tab buttons may further include the following.

A coordinate of the tab button that has not fallen within the focusing area is modified so that the coordinate of the tab button that has not fallen within the focusing area is located outside the display screen in the coordinate system.

The example method for managing the tab buttons may further include the following. When a sliding operation at the page is detected, a transparent degree of the currently displayed tab button is modified.

The example method for managing the tab buttons may further include the following. When the page is initially displayed or refreshed, the sliding bar is displayed or popped out. An attribute of the tab sliding bar is modified such that a tab button determined as a default tab button in the tab sliding bar is displayed in the focusing area, and coordinates of tab buttons other than the default tab button in the tab sliding bar are to be located outside of the area of the screen in the coordinate system.

The present disclosure provides an example system for managing tab buttons. The example system may include a focusing module and a displaying module. The focusing module sets up a focusing area at a display screen and, during a process that the tab sliding bar is slid, obtains information of the tab button among multiple tab buttons that has fallen within the focusing area. The displaying module uses the information of the tab button that has fallen within the focusing area as input information at a page and displays the page according to the input information.

For example, the page may include a list of search results. The list of search results includes one or more business objects. For example, the displaying module may include an information inputting unit and a ranking and displaying unit. The information inputting unit extracts the information of the tab button that has fallen within the focusing area as input information. The ranking and displaying unit re-ranks and displays the one or more business objects according to the input information.

For example, the focusing module may include a determining unit and an obtaining unit. The determining unit sets the focusing area at the area of the screen and, during the process that the tab sliding bar is slid, determines the tab button that has fallen within the focusing area. The obtaining unit obtains information of the tab button that has fallen within the focusing area.

The example system may further include a coordinate module. The coordinate module constructs a coordinate system including the area of the screen and assigns a coordinate to the focusing area and each tab button respectively. An example method for obtaining information of the tab button that has fallen in the focusing area may include the following. When a time period that the tab buttons are not slid reaches a first time threshold, a tab button with a minimal coordinative difference from the focusing area is determined as having fallen within the focusing area.

For example, the coordinating module may include a coordinate modifying unit that modifies a coordinate of the tab button that has not fallen within the focusing area to be outside the display screen in the coordinate system.

For example, the example system may further include a transparency module that, when a sliding operation at the page is detected, modifies a transparent degree of the currently displayed tab button.

For example, the example system may further include a tab bar module that, when the page is initially displayed or refreshed, displays or pops out the tab sliding bar, and modifies an attribute of the tab sliding bar so that a tab button determined as a default tab button in the tab sliding bar is displayed in the focusing area. The coordinate modifying unit further modifies coordinates of tab buttons other than the default tab button in the tab sliding bar to be outside the display screen in the coordinate system.

The present techniques use the focusing area to obtain information of the tab button that has fallen within the focusing area and use such information as the input information to display the page, thereby improving accuracy of selecting the tab button and avoiding clicking the wrong button or failure to click the tab button. The present techniques also save the space of the screen by hiding one or more tab buttons at a proper time without affecting the user to find all tab buttons in the tab sliding bar.

BRIEF DESCRIPTION OF THE DRAWINGS

To better illustrate the embodiments of the present disclosure, the following is a brief introduction of the FIGs to be used in the description of the embodiments. It is apparent that the following FIGs only relate to some embodiments of the present disclosure. A person of ordinary skill in the art can obtain additional embodiments of the present disclosure according to the FIGs in the present disclosure without creative efforts. The example embodiments and their specifications are used to illustrate the present disclosure and shall not constitute restrictions to the present disclosure.

DETAILED DESCRIPTION

The present techniques are described in detail below by reference to the FIGS and example embodiments to illustrate purposes, technical plans, and advantages of the present disclosure. It is apparent that the embodiments described herein are only some embodiments instead of all embodiments of the present disclosure. All other embodiments that could be obtained by a person having ordinary skill in the art based on the example embodiments of the present disclosure without any creative efforts shall be regarded as falling within the protection scope of the present disclosure.

Figure 1:
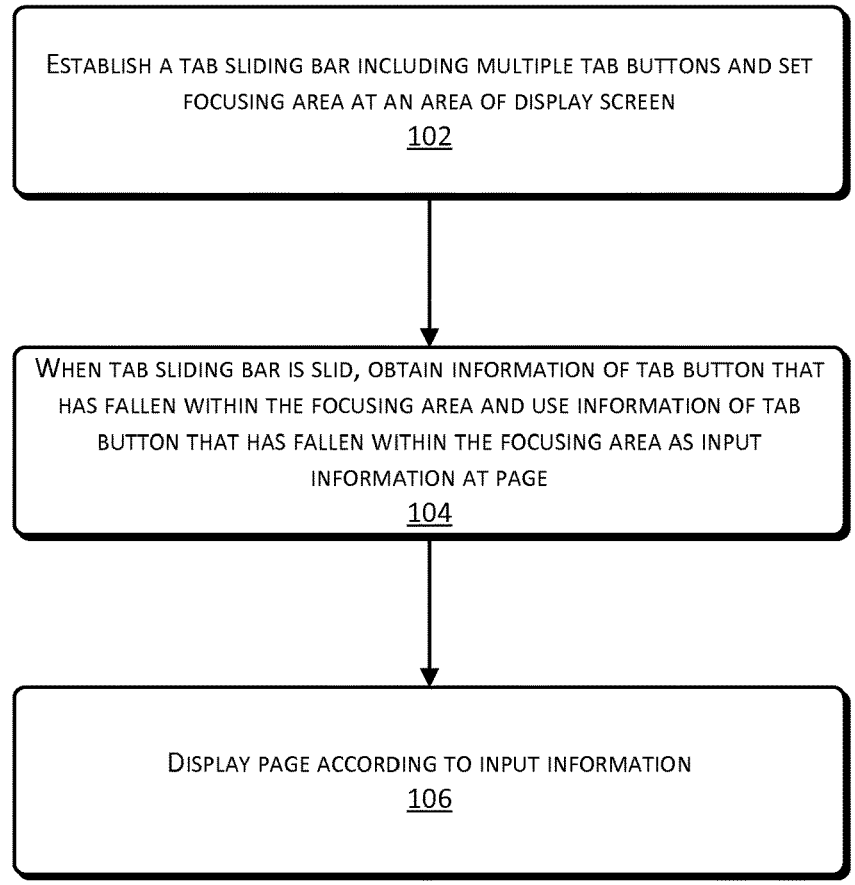
FIG. 1 illustrates a flow chart of an example method for managing tab buttons according to an example embodiment of the present disclosure.

FIG. 1 illustrates a flow chart of an example method for managing tab buttons according to an example embodiment of the present disclosure. In an embodiment, the present techniques use a focusing area to obtain information of information of a tab button that has fallen within the focusing area.

At 102, a tab sliding bar including a plural of tab buttons is established. The focusing area is set at an area of a display screen.

These operations are basic procedures in the example embodiment of the present disclosure, in which the following operations are achieved by applying the tab sliding bar and the focusing area established herein.

At 104, during a process that the tab sliding bar is slid, information of the tab button that has fallen within the focusing area is obtained. The information of the tab button that has fallen within the focusing area is used as input information at a page.

The present techniques described herein are portions of the example embodiment, in which the information of the tab button is obtained through the focusing area instead of directly clicking the tab buttons. The tab sliding bar built in the operations can be slid by an operation of a user, and a position of a tab button in the tab sliding bar is changed accordingly when the tab sliding bar is slid. Thus, the user may slide the tab sliding bar to control which tab buttons fall within the focusing area.

Figure 2:
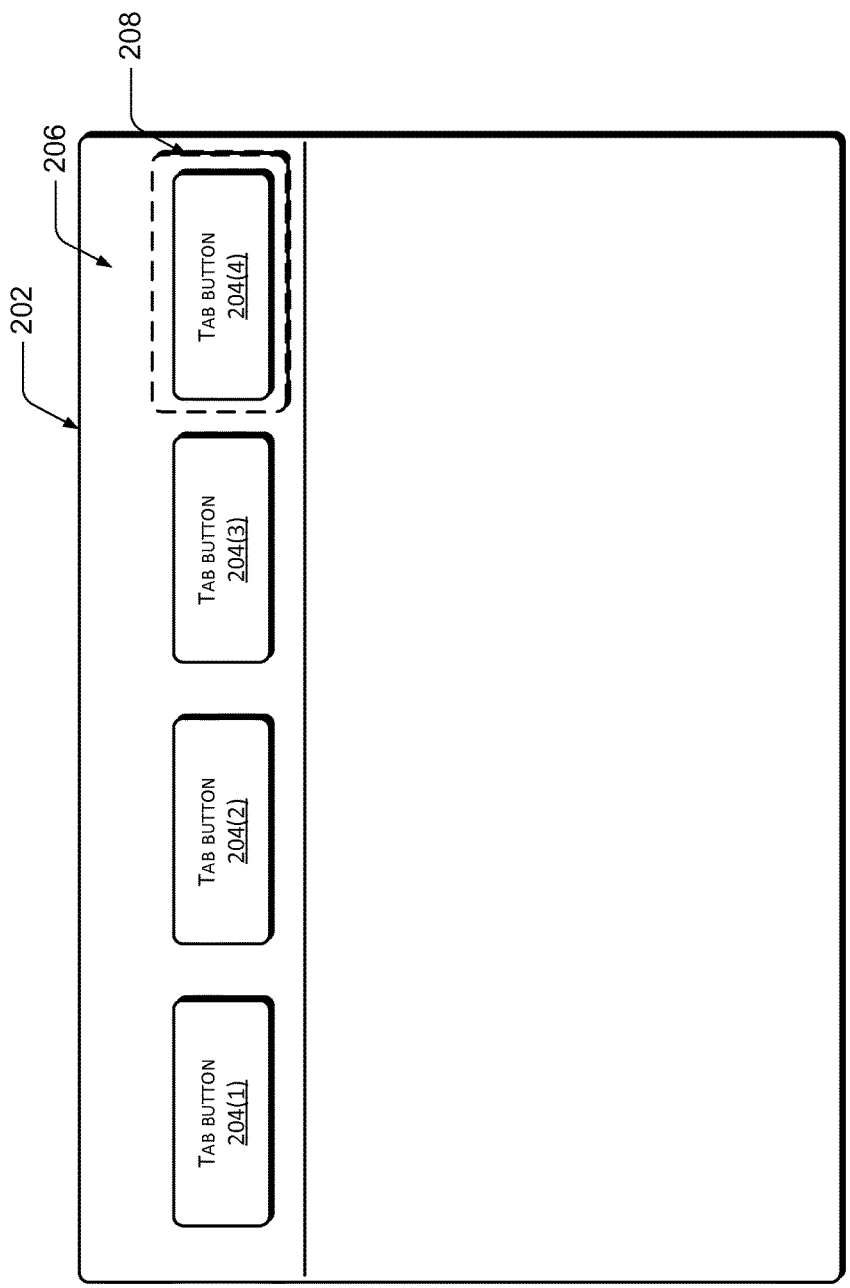
FIG. 2 illustrates a schematic diagram of an example page displayed at a mobile terminal.

FIG. 2 illustrates a schematic diagram of an example page 202 displayed at a mobile terminal. Tab buttons, such as a tab button 204(1), a tab button 204(2), a tab button 204(3), and a tab button 204(4), are arranged horizontally in a tab sliding bar 206. A focusing area 208 is illustrated as a block in form of a dotted line. In FIG. 2, the tab button 204(4) has fallen within the focusing area 208 so that the information represented by the tab button 204(4) is used as input information.

At 106, the page is displayed according to the input information.

In an example embodiment, when a specific tab button has fallen within the focusing area, the tab button is regarded as being chosen. An achieved technical effect is the same as that of actually clicking the tab button in the conventional techniques. That is, corresponding display is presented according to the information of the chosen tab button. In the example embodiment, after the tab button is chosen by means of the focusing area, the information of the chosen tab button is used as input information, and the page is displayed according to the input information. The related effect of choosing the tab button is thus achieved.

The information of the tab button is obtained through the focusing area, and the obtained information of the tab button is used as the input information to display the page. Thus, the present techniques replace the conventional manner of clicking the tab button, thereby improving the accuracy for choosing the tab button and avoiding a situation of mistakenly clicking another tab button or of failing to click the tab button.

Figure 3:
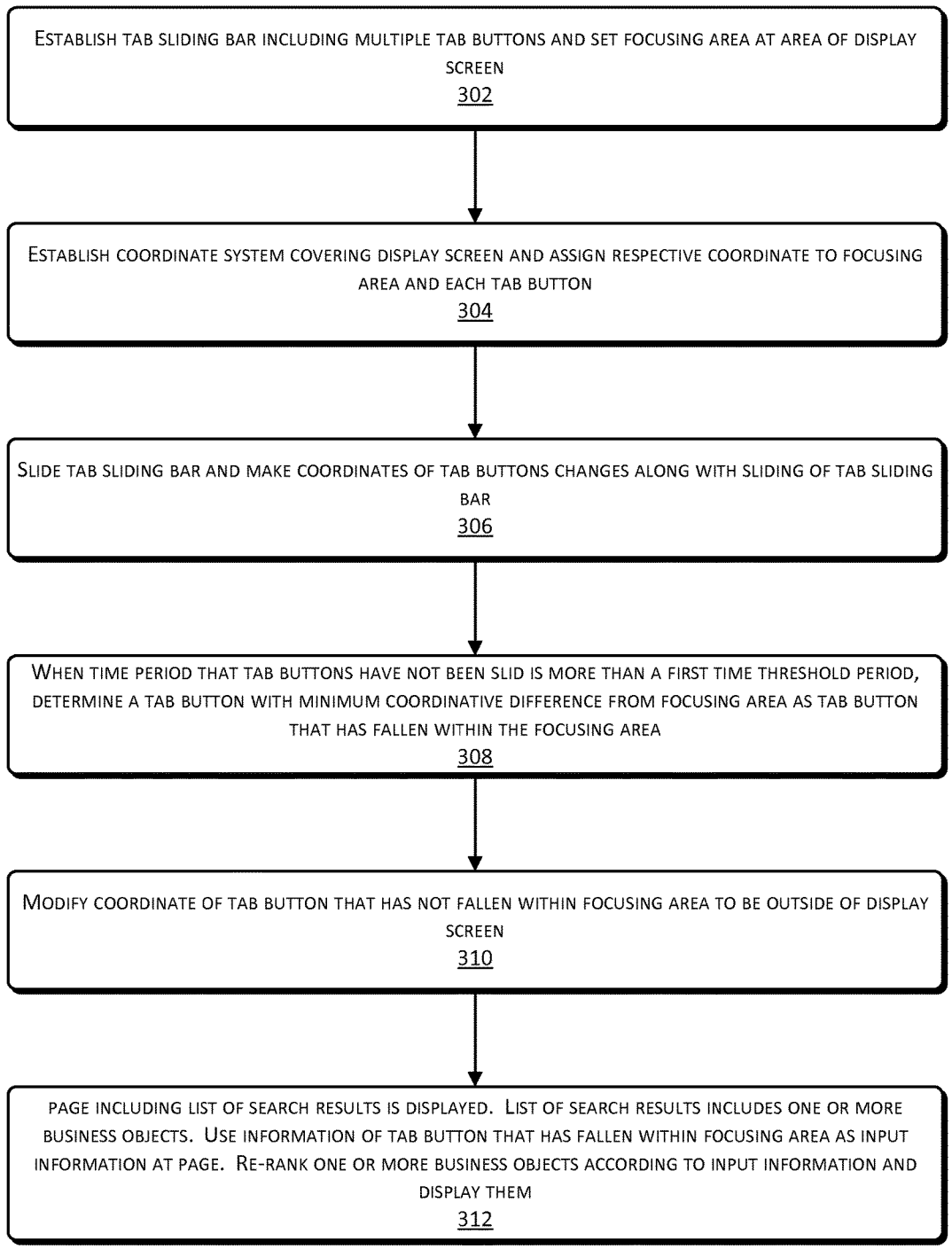
FIG. 3 illustrates a flow chart of another example method according to another example embodiment of the present disclosure.

FIG. 1 illustrates a basic embodiment of the present disclosure, based on which many other extension and modification may be conducted. FIG. 3 shows a flow chart of another example method according to another embodiment of the present disclosure. In this embodiment, the application scenario is a mobile application program at a mobile terminal for an e-commerce application such as Taobao.com. The tab sliding bar may include four tab buttons such as a tab button of popularity, a tab button of price, a tab button of sale volume, and a tab button of credit. The user may click any one of the tab buttons to list products according to attribute represented by a particular tab button.

The method according to an embodiment of the present disclosure comprises:

At 302, the tab sliding bar including multiple tab buttons is established. The focusing area is set at the display area.

At 304, a coordinate system covering the display screen is constructed. The focusing area and each tab button are assigned a coordinate respectively.

After the coordinate system for the display of the mobile terminal is constructed, the coordinate system may be used to accurately assign positions of various display contents at the display. After the coordinate system is established, the focusing area and every tab button are allocated with a coordinate respectively. For example, the focusing area may be represented as a specific range of coordinates. A tab button can be positioned by its coordinate so that the management for its position can be achieved.

It should be noted that the coordinate of the tab button can be located either inside or outside of the display screen. If the coordinate of the tab button is located inside of the display screen, it indicates that the tab button is displayed corresponding to its coordinate at the display screen. If the coordinate of the tab button is null or located outside of the display screen, the tab button is not displayed on the display screen. However, the tab button should not be regarded as having disappeared from the display screen in a viewpoint from a program processing. After the coordinate of the tab button is adjusted within the display screen, the tab button is displayed at the display screen. The above principle applies for hiding the tab button in the present disclosure.

At 306, the tab sliding bar is slid and a respective coordinate of a respective tab button changes according to a sliding movement of the tab sliding bar.

In this embodiment, the user may slide the tab sliding bar to change the position of the tab button that is displayed on the display screen. In essence, the coordinate of the tab button is changed. By sliding the tab sliding bar, the user may actively select a desired tab button to be fallen within the focusing area.

At 308, when a time period that the tab buttons have not been slid is more than a first time threshold period, a tab button with a minimum coordinative difference from the focusing area is determined as the tab button that has fallen within the focusing area.

When the time period that the tab buttons have not been slid is more than the first time threshold period, it would be deemed that the user has completed the sliding movement for the tab sliding bar, and the selected tab button has been placed to be within the focusing area.

For example, in a practical implementation, during the process of sliding the tab sliding bar, it is not necessary that the tab button completely falls within the focusing area. As referring to FIG. 2, it is not necessary for the user to completely and precisely locate the tab button to have fallen within a block of dotted lines which represent the focusing area. It only requires one of the tab buttons to be roughly overlapped with the block of dotted lines, and then a back-end computing device may automatically find the tab button with a minimum coordinate difference from the focusing area by comparing a coordinate difference between each tab button and the focusing area, i.e., the tab button that is roughly overlapped with the focusing area. Accordingly, the coordinate of such tab button is modified automatically to be precisely overlapping with the focusing area and thus to enable the tab button to have fallen within the focusing area.

At 310, for example, the coordinate of the tab button that has not fallen within the focusing area is modified to be outside of the display screen.

This example operation in the example embodiment saves space of the display screen at the mobile terminal and increases a utilizing efficiency for the space of the display screen. In this example embodiment, it assumes that the tab button that is located outside of the focusing area is the button that the user will temporarily not operate. Thus, this operation hides the tab button that is temporarily not used to prevent the tab button from occupying too much space of the display screen.

At 312, for example, the page including a list of search results is displayed. The list of the search results includes one or more business objects. The information of the tab button that has fallen within the focusing area is used as input information at the page. The one or more business objects are re-ranked according to the input information and then displayed.

Figure 4:
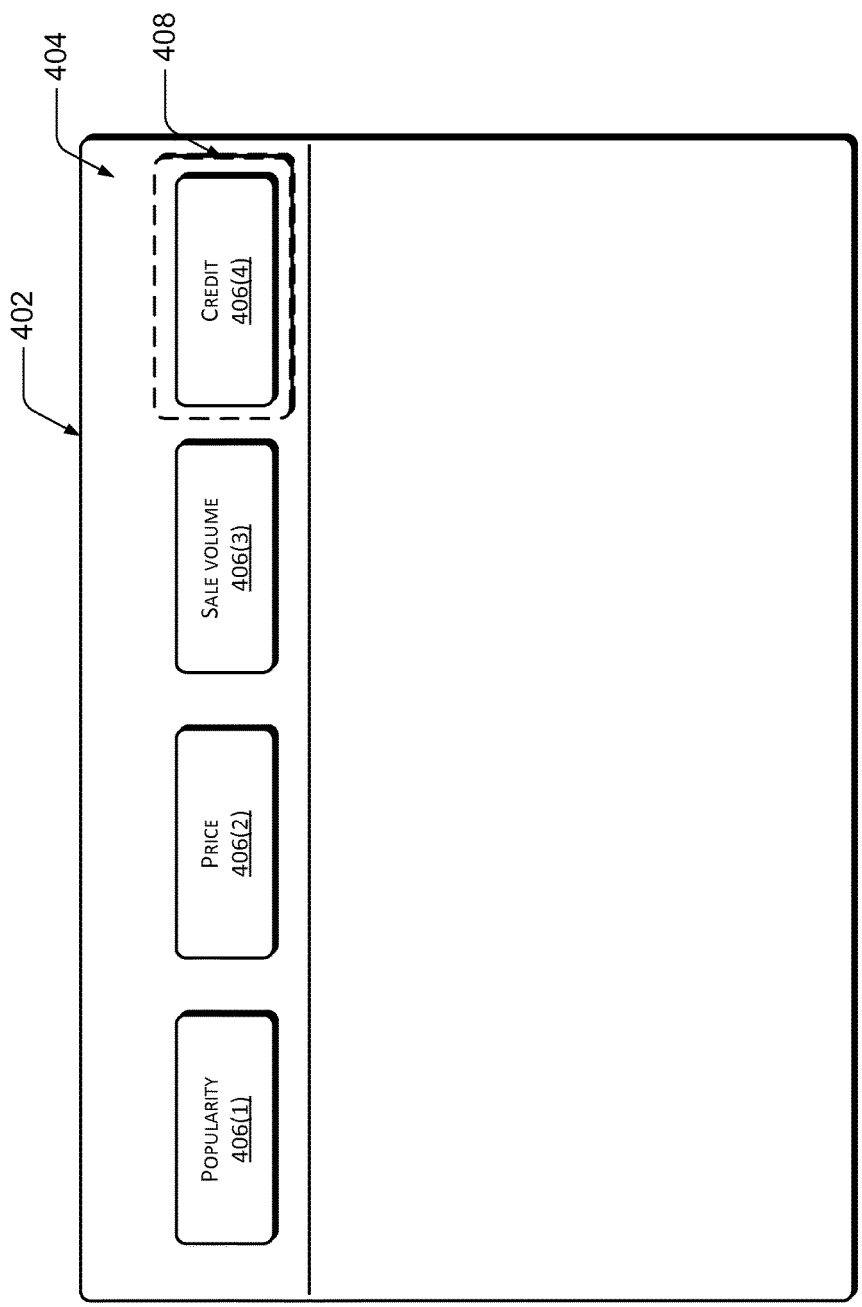
FIG. 4 and FIG. 5 show schematic views of the example page that is displayed at the mobile client terminal of an e-commerce website.
Figure 5:
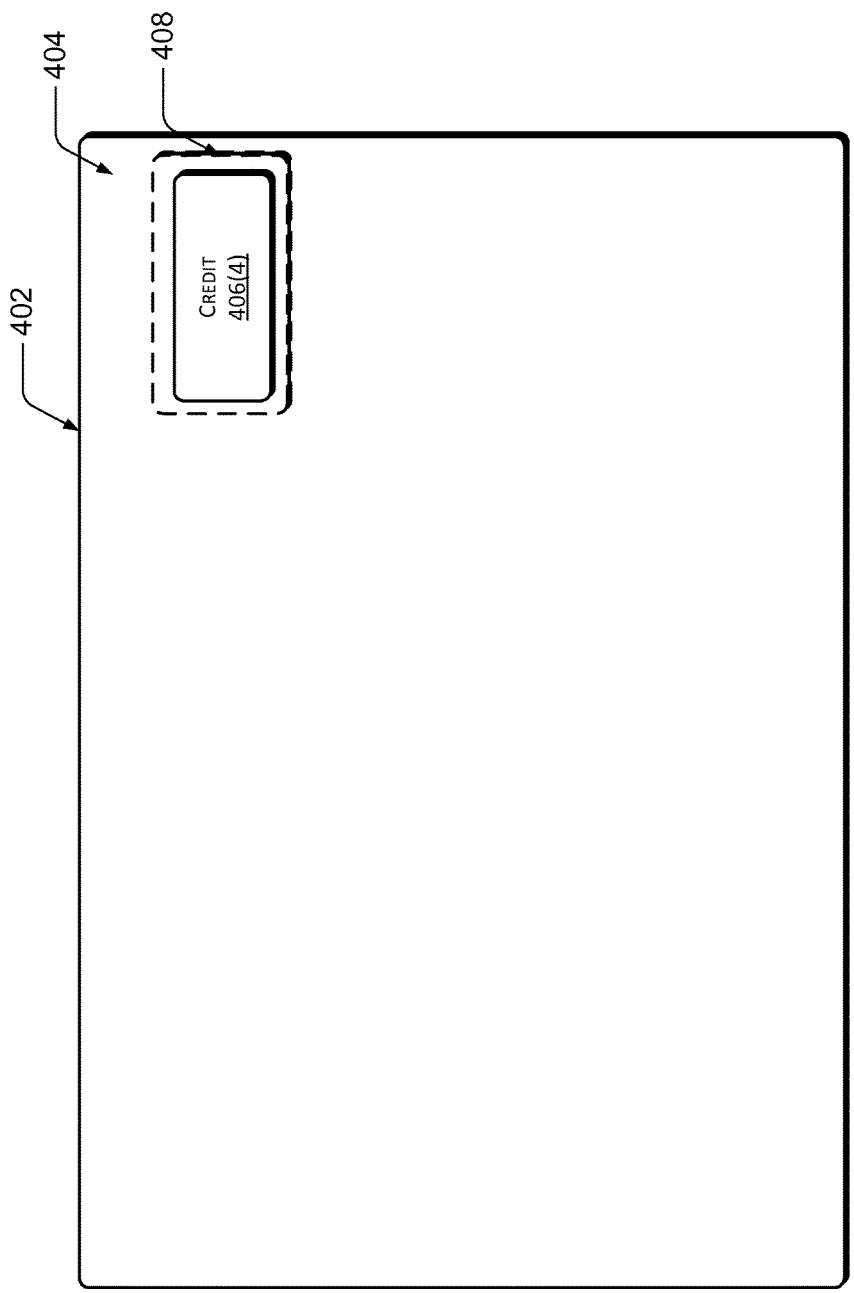

FIG. 4 and FIG. 5 show schematic views of the example page 402 that is displayed at the mobile client terminal for an e-commerce website such as Taobao™. The user uses the mobile client terminal to search business objects such as correlated products and the correlated products (not shown) are displayed at a main area of the page. FIG. 4 illustrates a diagram of an example tab sliding bar in full display status. The example tab sliding bar 404, for example, may include four tab buttons. A tab button 406(1) represents popularity. A tab button 406(2) represents price. A tab button 406(3) represents sale volume. A tab button 406(4) represents credit. The tab button 406(4) representing credit falls within the focusing area 408. FIG. 5 illustrates a schematic view of the page 402 after the tab buttons that have not fallen within the focusing area 408 are hidden. In FIG. 5, among the tab buttons, only the tab button 406(4) representing credit is displayed.

In this example embodiment, the information of the tab button that has fallen within the focusing area represents credit. Thus, credit is used as input information. The products obtained from a search may be sorted in an ascending or descending sequence according to the credit attribute and re-displayed at the page. As a result, the present techniques achieve the same result as clicking the tab button 406(4) credit.

The present techniques enhance the technical implementation by applying the coordinate system to allocate and modify coordinates of the tab buttons. Moreover, the present techniques may optionally hide the tab buttons that have not fallen in the focusing area to further save the space of the display screen at the mobile terminal and improve the utilizing efficiency of the display screen.

Based on the example embodiment as shown in FIG. 3, the present disclosure may have two optional and extensible technical characteristics.

Between the operations at 304 and the operations at 306 of the example method as shown in FIG. 3, the operations may further include the following.

When the page is initially displayed or refreshed, the tab sliding bar is displayed or popped out. An attribute of the tab sliding bar is modified so that a tab button set as a default tab button is displayed in the focusing area, and the coordinates of the tab buttons of the tab sliding bar other than the default tab button of the tab sliding bar are located outside of the display screen.

In order to enable the user to clearly and intuitively find the tab buttons that are included in the webpage, the tab buttons are not hidden when the initial display changes. Instead, the tab sliding bar is popped out so that the user may see the tab sliding bar in full. Then the default tab button fallen within the focusing area is reserved while the other tab buttons are hidden.

Through the extended operations at 304, the present techniques do not prevent the user from knowing the detailed tab buttons included in the tab sliding bar and hide some tab buttons when appropriate, thereby saving the display screen.

For another example, the example embodiment of the present disclosure as shown in FIG. 3 may include the following optional operations.

When the sliding operation at the page is detected, a transparent degree of the currently displayed tab button at the page is modified.

For instance, according to a usual operational habit of the user, when the user pulls down a browser interface, the user often wants to browse a product or other contents below the current display screen. The operations of the tab buttons may not be necessary at this time. Therefore, when the user instructs to conduct a pull down operation at the browser interface, the tab buttons remaining in the focusing area have no use. When the transparent degree of the tab button remaining in the display screen is modified to 100%, it is equivalent to hide and not to display the tab button, thereby saving the utilizing efficiency of the display screen. In contrast, when the user instructs to conduct a pull up operation at the browser interface, it is probably that the user needs to operate the tab buttons. Thus, the transparent degree of the tab button is modified to 0% so that the user may easily find the tab button to conduct further operations.

Figure 6:
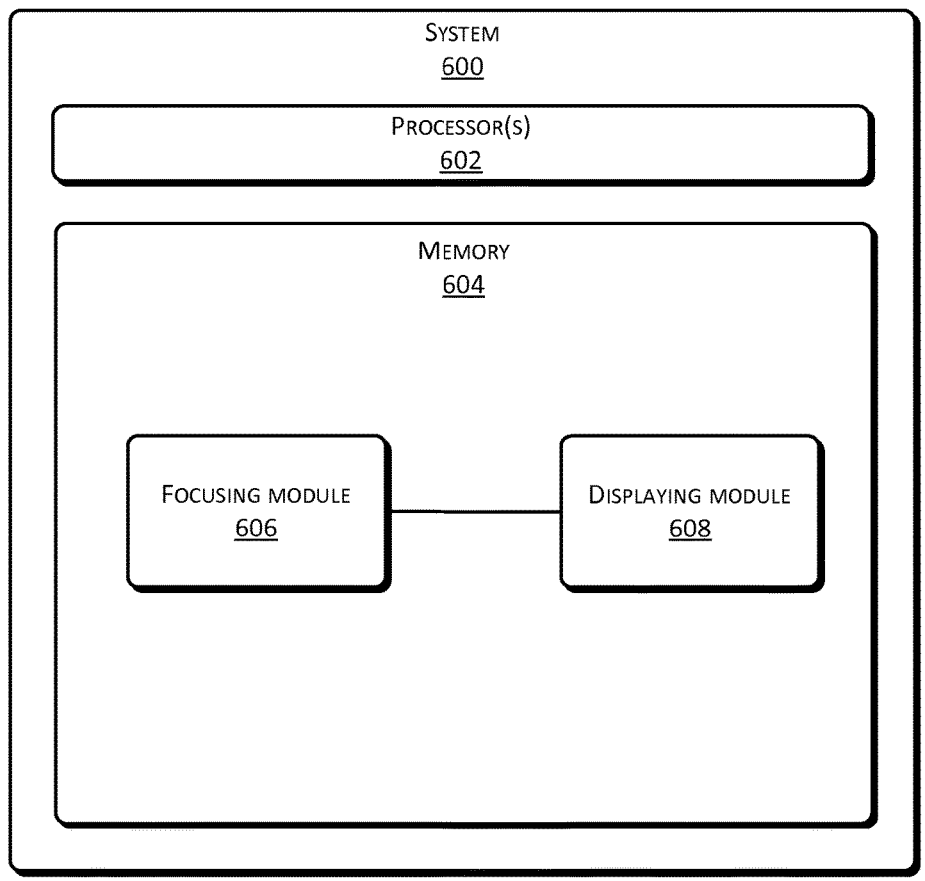
FIG. 6 illustrates a diagram of an example system for managing the tab buttons in accordance with the present disclosure.

FIG. 6 illustrates a diagram of an example system 600 for managing the tab buttons in accordance with the present disclosure. The example system 600 may implement the example method as shown in FIG. 1. The techniques in both example embodiments have no substantial differences and may be referenced to each other.

The system 600 may include one or more processor(s) 602 and memory 604. The memory 604 is an example of computer-readable media. As used herein, "computer-readable media" includes computer storage media and communication media.

Computer storage media includes volatile and non-volatile, removable and non-removable media implemented in any method or technology for storage of information such as computer-executed instructions, data structures, program modules, or other data. In contrast, communication media may embody computer-readable instructions, data structures, program modules, or other data in a modulated data signal, such as a carrier wave. As defined herein, computer storage media does not include communication media. The memory 604 may store therein program units or modules and program data.

In the example of FIG. 6, the memory 604 may store therein a focusing module 606 and a displaying module 608. The focusing module 606 sets up a focusing area at a display screen and, during a process that the tab sliding bar is slid, obtains information of the tab button among multiple tab buttons that has fallen in the focusing area. The displaying module 608 uses the information of the tab button that has fallen within the focusing area as input information at a page and displays the page according to the input information.

The present techniques use the focusing area to obtain information of the tab button that has fallen within the focusing area and use such information as the input information to display the page, thereby replacing manually clicking the tab button in the conventional techniques, improving accuracy of selecting the tab button, and avoiding clicking the wrong button or failure to click the tab button.

Figure 7:
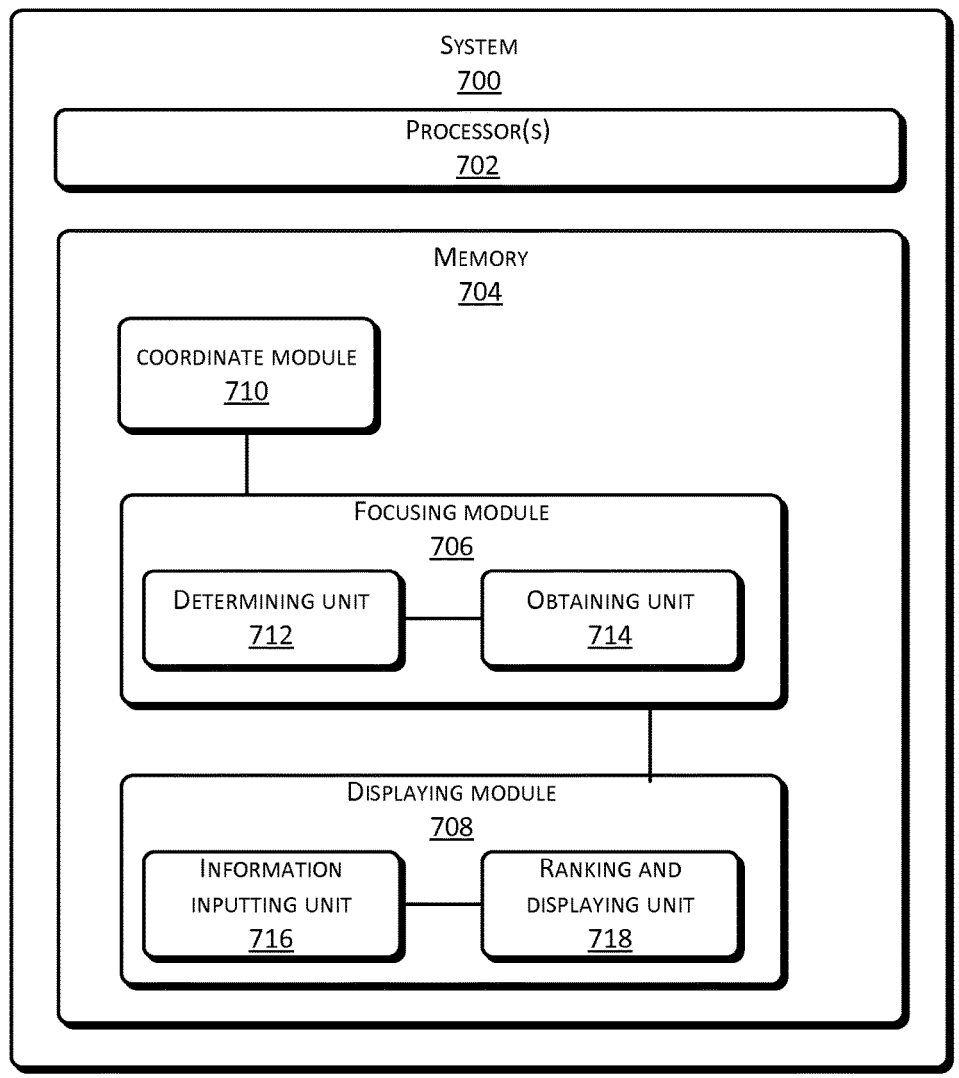
FIG. 7 illustrates a diagram of another example system for managing the tab buttons in accordance with the present disclosure.

FIG. 7 illustrates a diagram of an example system 700 for managing the tab buttons in accordance with the present disclosure. The system 700 may include one or more processor(s) 702 and memory 704. The memory 704 may store therein a focusing module 706, a displaying module 708, and a coordinate module 710. The focusing module 706 sets up a focusing area at a display screen and, during a process that the tab sliding bar is slid, obtains information of the tab button among multiple tab buttons that has fallen within the focusing area.

For example, the focusing module 706 may include a determining unit 712 and an obtaining unit 714.

The determining unit 712 sets the focusing area at the area of the display screen and, during the process that the tab sliding bar is slid, determines the tab button that has fallen within the focusing area. For instance, when a time period that the tab buttons have not been slid is more than a first time threshold period, a tab button with a minimum coordinative difference from the focusing area is determined as the tab button that has fallen within the focusing area.

The obtaining unit 714 obtains information of the tab button that has fallen within the focusing area.

The displaying module 708 uses the information of the tab button that has fallen within the focusing area as input information at a page and displays the page according to the input information.

For example, the page may include a list of search results. The list of search results includes one or more business objects. For example, the displaying module 708 may include an information inputting unit 716 and a ranking and displaying unit 718. The information inputting unit 716 extracts the information of the tab button that has fallen within the focusing area as the input information. The ranking and displaying unit 718 re-ranks the one or more business objects according to the input information and displays them.

The coordinate module 710 constructs a coordinate system including the area of the display screen and assigns a coordinate to the focusing area and each tab button respectively. For example, the coordinate module 710 may include a coordinate modifying unit (not shown in FIG. 7) that modifies a coordinate of a tab button that has not fallen within the focusing area to be outside the area of the display screen in the coordinate system. In addition, the coordinate modifying unit may modify coordinates of tab buttons that are not the default tab button in the tab sliding bar to be outside the area of the display screen in the coordinate system.

For example, the system 700 may further include a transparency module (not shown in FIG. 7) that, when a sliding operation at the page is detected, modified a transparent degree of the currently displayed tab button at the page.

For example, the system 700 may further include a tab bar module (not shown in FIG. 7) that, when the page is initially displayed or refreshed, displays or pops out the tab sliding bar, and modifies an attribute of the tab sliding bar so that a tab button determined as the default tab button in the tab sliding bar is displayed in the focusing area.

It is noted that some functional modules or units are not shown in FIG. 7.

For example, the above example system may correspond to the example method as shown in FIG. 3. Some detailed techniques have been described in the example embodiment of FIG. 3 and are not described herein.

The present techniques enhance the technical implementation by applying the coordinate system to allocate and modify coordinates of the tab buttons. Moreover, the present techniques may hide the tab buttons that have not fallen in the focusing area, opt out the tab sliding bar, and modify the transparent degree of the tab button. Thus, the present techniques do not prevent the user from finding the detailed tab buttons included in the tab sliding bar and do hide some tab buttons when appropriate, thereby saving the space of the display screen.

It should be noted that the above descriptions merely describe some example embodiments of the present disclosure. Modification and variations may be made by a person having ordinary skill in the art without departing from the spirit of the present disclosure, and all such modifications and variations should be considered as falling within the scope of the present disclosure.

What is claimed is:

1. A method comprising:
   establishing a tab sliding bar including two or more tab buttons on a display screen of a hand-held device;
   setting a focusing area at an area of the tab sliding bar on the display screen;
   establishing a coordinate system covering the display screen;
   assigning a respective coordinate to the focusing area and each of the two or more tab buttons;
   sliding the tab sliding bar by a user, wherein a tab button of the two or more tab buttons falls within the focusing area;
   in response to the tab button falling within the focusing area;
      obtaining information of the tab button that has fallen within the focusing area;
      modifying the respective coordinates of the respective tab buttons that have not fallen within the focusing area to be outside the display screen in the coordinate system;
      using information of the tab button as input information at a page on the display screen; and
      re-displaying the page according to the input information;
   wherein the tab sliding bar is displayed in full showing the two or more tab buttons when the page on the display screen is initially displayed, and wherein when the user conducts a pull down operation at a browser interface containing the page, a transparent degree of the tab button still displayed within the focusing area on the screen is modified to 100% to be invisible, and when a user conducts a pull up operation at the browser interface containing the page, the transparent degree of the tab button within the focusing area is modified to 0% to be visible.

2. The method as recited in claim 1, further comprising:
   determining a default tab button among the two or more tab buttons at the tab sliding bar; and
   displaying the default tab button at the focusing area.

3. The method as recited in claim 1, wherein the page on the display screen comprises a list of search results.

4. The method as recited in claim 3, wherein the list of search results includes one or more business objects.

5. The method as recited in claim 4, wherein using the information of the tab button as the input information at the page on the display screen comprises:
   re-ranking the search results according to the input information; and
   displaying the re-ranked search results.

6. The method as recited in claim 1, wherein obtaining the information of the tab button that has fallen within the focusing area comprises:
   when a time period that the two or more tab buttons have not been slid is more than a first time threshold, determining a respective tab button with a minimal coordinative difference from the focusing area as the tab button that has fallen within the focusing area.

7. The method as recited in claim 6, further comprising:
   adjusting an attribute of the tab sliding bar such that a default tab button at the tab sliding bar is displayed at the focusing area and one or more tab buttons other than the default tab button are located outside of the area of the display screen in the coordinate system.

8. A method comprising:
   establishng a tab sliding bar including two or more tab buttons on a display screen of a hand-held device;
   setting a focusing area at an area of the tab sliding bar on the display screen that a tab button of the two or more tab buttons falls within the focusing area with a sliding movement of the tab sliding bar by a user;
   establishing a coordinate system covering the display screen;
   assigning a respective coordinate to the focusing area and each of the two or more tab buttons;
   changing the respective coordinate of each of the two or more tab buttons when a sliding movement of the tab sliding bar by the user is detected, wherein a tab button of the two or more tab buttons falls within the focusing area;
   in response to the tab button falling within the focusing area;
      modifying the respective coordinates of the respective tab buttons that have not fallen within the focusing area to be outside of the display screen in the coordinate system;
   wherein the tab sliding bar is displayed in full showing the two or more tab buttons when a page on the display screen is initially displayed, and wherein when the user conducts a pull down operation at a browser interface containing the page, a transparent degree of the tab button still displayed within the focusing area on the screen is modified to 100% to be invisible, and when a user conducts a pull up operation at the browser interface containing the page, the transparent degree of the tab button within the focusing area is modified to 0% to be visible.

9. The method as recited in claim 8, further comprising when a time period that the two or more tab buttons have not been slid is more than a first time threshold, determining a respective tab button with a minimal coordinative difference from the focusing area as the tab button within the focusing area.

10. The method as recited in claim 8, further comprising:
   in response to the tab button falling within the focusing area;
      obtaining information of the tab button that has fallen within the focusing area;
      using information of the tab button as input information at a page on the display screen; and
      re-ranking search results at a page displayed at the display screen according to the input information; and
      displaying the re-ranked search results.

11. A hand-held device comprising:
   one or more processors; and
   memory including instructions executable by the one or more processors, which when executed perform the following steps:
      establishing a tab sliding bar including two or more tab buttons on a display screen of the hand-held device;
      setting up a focusing area at an area of the tab sliding bar on the display screen;
      establishing a coordinate system covering the display screen;
      assigning a respective coordinate to the focusing area and each of the two or more tab buttons;
      obtaining information of a tab button, among the two or more tab buttons of the tab sliding bar, that has fallen within the focusing area when a sliding movement of the tab sliding bar by a user is detected;
      modifying the respective coordinates of the respective tab buttons that have not fallen within the focusing area to be outside the display screen in the coordinate system;
      using the information of the tab button that has fallen within the focusing area as input information at a page on the display screen; and
      re-displaying the page according to the input information;
      wherein the tab sliding bar is displayed in full showing the two or more tab buttons when the page on the display screen is initially displayed, and wherein when the user conducts a pull down operation at a browser interface containing the page, a transparent degree of the tab button still displayed within the focusing area on the screen is modified to 100% to be invisible, and when a user conducts a pull up operation at the browser interface containing the page, the transparent degree of the tab button within the focusing area is modified to 0% to be visible.

12. The device as recited in claim 11, wherein the steps further comprise when a time period that the two or more tab buttons are not slid is more than a first time threshold, determining a respective tab button with a minimal coordinative difference from the focusing area as the tab button within the focusing area.

13. The device as recited in claim 11, wherein the steps further comprise, when the sliding movement at the page is detected, modifying a transparent degree of the displayed tab button at the page.

14. The device as recited in claim 11, wherein the steps further comprise, modifying an attribute of the tab sliding bar so that a respective tab button determined as a default tab button in the tab sliding bar is displayed in the focusing area.

* * * * *